(12) United States Patent
Wakabayashi et al.

(10) Patent No.: US 9,633,760 B2
(45) Date of Patent: Apr. 25, 2017

(54) WATER STOPPING STRUCTURE FOR INSULATION-COATED WIRE AND WIRE HARNESS

(71) Applicant: SUMITOMO WIRING SYSTEMS, LTD., Mie (JP)

(72) Inventors: Masataka Wakabayashi, Mie (JP); Hiroyuki Ootsuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/739,291

(22) Filed: Jun. 15, 2015

(65) Prior Publication Data

US 2015/0372464 A1    Dec. 24, 2015

(30) Foreign Application Priority Data

Jun. 20, 2014  (JP) .................................. 2014-127134

(51) Int. Cl.
  *H01B 7/282* (2006.01)
  *H02G 3/04* (2006.01)
  (Continued)

(52) U.S. Cl.
  CPC ............... *H01B 7/282* (2013.01); *H01R 4/24* (2013.01); *H01R 4/2445* (2013.01);
  (Continued)

(58) Field of Classification Search
  CPC ...... H02G 3/0406; H01B 7/0045; H01B 7/00; H01R 4/72

USPC .... 174/68.3, 68.1, 70 R, 71–72, 72 A, 74 R, 174/75 R, 76, 77 R, 80, 74 A, 84 R, 90, 174/93, 94 R, 84 C, 98, 99 R, 110 R, 174/137 R, 138 R, 139, 154, 168, 172, 174/188–189, 78–79, 88 R; 439/387, 439/389, 393, 395–407
  See application file for complete search history.

(56) References Cited

U.S. PATENT DOCUMENTS 3,320,354 A  *  5/1967  Marley ................ H01R 4/2495
                                                174/84 C
3,410,950 A  *  11/1968  Freudenberg .......... H01R 4/206
                                                174/84 C
(Continued)

FOREIGN PATENT DOCUMENTS

JP       2000-113917       4/2000
JP       2008-131327       6/2008

*Primary Examiner* — Dimary Lopez Cruz
(74) *Attorney, Agent, or Firm* — Greenblum & Bernstein, P.L.C.

(57) ABSTRACT

A water blocking structure for an insulation-coated wire includes a heat-shrinkable tubular protective member that is closed at one end by a stopper and that accommodates an intermediate portion of an insulation-coated wire, and a resin material that is accommodated in the protective member and that penetrates the intermediate portion of the insulation-coated wire. Slit portions are formed in a coating of the insulation-coated wire within the protective member, the slit portions extending in a direction that crosses the axis of the insulation-coated wire on opposite sides of the intermediate portion with respect to a radial direction, and a water blocking agent penetrates the intermediate portion via these slit portions.

10 Claims, 7 Drawing Sheets

(51) Int. Cl.
 *H02G 15/04* (2006.01)
 *H01R 4/72* (2006.01)
 *H01R 4/24* (2006.01)
 *H02G 3/30* (2006.01)

(52) U.S. Cl.
 CPC ............. *H01R 4/2466* (2013.01); *H01R 4/72* (2013.01); *H02G 3/0406* (2013.01); *H02G 3/0462* (2013.01); *H02G 15/043* (2013.01); *H02G 3/30* (2013.01)

(56) References Cited

U.S. PATENT DOCUMENTS

| | | | | |
|---|---|---|---|---|
| 3,507,977 A * | 4/1970 | Pusey | ...................... | H01R 4/00 174/110 PM |
| 3,612,747 A * | 10/1971 | Shlesinger, Jr. | ..... | H01R 4/2495 174/117 F |
| 3,768,941 A * | 10/1973 | D'Ascoli | ................. | H01R 4/01 174/87 |
| 3,926,498 A * | 12/1975 | Hoppe, Jr. | ............. | H01R 13/28 439/400 |
| 4,075,417 A * | 2/1978 | Neale, Sr. | .............. | H01R 4/245 174/84 C |
| 4,600,804 A * | 7/1986 | Howard | ................... | H01R 4/20 174/84 C |
| 5,004,869 A * | 4/1991 | Koblitz | .............. | H01R 13/5216 174/84 C |
| 9,004,937 B2 * | 4/2015 | Tarulli | ................... | H01R 12/57 174/261 |
| 2003/0153207 A1 * | 8/2003 | Lin | ...................... | H01R 4/2454 439/402 |
| 2006/0048965 A1 * | 3/2006 | Ootsuki | ................... | H01R 4/22 174/74 A |
| 2007/0082539 A1 * | 4/2007 | Pavlovic | .............. | H01R 4/2458 439/400 |

* cited by examiner

WATER STOPPING STRUCTURE FOR INSULATION-COATED WIRE AND WIRE HARNESS

TECHNICAL FIELD

The present invention relates to a water blocking structure for an insulation-coated wire and a wire harness, and particularly relates to a water blocking structure for an insulation-coated wire that is effective when provided at an intermediate portion of the insulation-coated wire and a wire harness.

BACKGROUND ART

In wire harnesses that are installed in automobiles and the like, often, a coating of an insulation-coated wire is partially stripped to expose a conductor composed of a group of elemental wires, and another wire is connected to the exposed portion of the conductor by welding or by using a crimp terminal, or a connection terminal is crimped onto the exposed portion of the conductor. In cases where such an exposed portion of a conductor or an electrical connection portion is disposed in an area that may be exposed to water, reliable waterproofing is required.

Therefore, conventionally, a branch connection structure has been proposed in which a terminal splice portion for branching a branch line from a trunk line of a wire harness serving as a communication line for an on-board network is housed in a protective cap made of resin, and this protective cap is fixed to a portion near end portions of respective coatings of the trunk line and the branch line by winding tape therearound or by using a heat-shrinkable tube or a water blocking agent (see JP 2008-131327A, for example).

Also, a waterproofing device has been proposed in which a core wire (conductor) exposed portion that is uncoated is formed at an intermediate portion of a plurality of coated lead wires that are bent upward in an inverted U shape, and a waterproof and heat-resistant insulating tube that is bent in an inverted U shape is provided, the insulating tube covering the core wire exposed portion of the plurality of coated lead wires (see JP 2000-113917A, for example).

JP 2008-131327A and JP 2000-113917A are examples of related art.

However, the former conventional water blocking structure for an insulation-coated wire, in which the terminal splice portion is contained in the protective cap, cannot be used for waterproofing of an intermediate splice portion.

On the other hand, even though the latter conventional water blocking structure for an insulation-coated wire, in which a plurality of coated lead wires having the core wire exposed portion are bent in an inverted U shape, can be used for blocking water at the conductor exposed portion in the intermediate portion or waterproofing of the intermediate splice portion, there are unsolved problems as described below.

That is to say, in the latter conventional water blocking structure for an insulation-coated wire, the insulation-coated wire with the conductor exposed portion formed at an intermediated portion thereof is inserted into the insulating protective tube, and that insulation-coated wire is folded in an inverted U shape together with the insulating protective tube at a position different from the conductor exposed portion that is easy to bend. Therefore, the operation of bending that insulation-coated wire and the insulating protective tube is not easy and thus increases the manufacturing cost. In addition, the insulating protective tube after bending tends to be corrugated or bent in the vicinity of the conductor exposed portion, and an end portion of the coating of the insulation-coated wire that is adjacent to the conductor exposed portion tends to be opened. Therefore, the water blocking ability may be easily deteriorated.

Furthermore, for both the conventional water blocking structures for an insulation-coated wire, a coating stripping operation of stripping off the coating at a predetermined position and in a section of a predetermined length in advance is indispensable. Therefore, in a case where, for example, a high level of water blocking performance is desired by preventing especially the intermediate portion of the insulation-coated wire from suffering secondary exposure to water from the terminal portion, the problems such as deterioration in workability and an increase in manufacturing cost cannot be avoided.

SUMMARY OF THE INVENTION

The present invention was made in order to address problems such as those described above, and it is an object thereof to provide a low-cost water blocking structure for an insulation-coated wire that can ensure high water blocking ability and favorable workability at an intermediate portion of the insulation-coated wire and also provide a low-cost wire harness having high water blocking ability and favorable workability.

In order to accomplish the above-described object, a water blocking structure for an insulation-coated wire according to the present invention is a water blocking structure for an insulation-coated wire, the water blocking structure including a heat-shrinkable tubular member that is closed at one end by a closing member and that accommodates an intermediate portion of an insulation-coated wire, and a water blocking agent that is accommodated in the tubular member and that penetrates the intermediate portion of the insulation-coated wire, wherein slit portions are formed in a coating of the insulation-coated wire within the tubular member, the slit portions extending in a direction that crosses an axis of the insulation-coated wire on opposite sides of the intermediate portion with respect to a radial direction, and the water blocking agent penetrates the intermediate portion via the slit portions.

With this configuration, the present invention eliminates the necessity to perform a coating stripping operation for exposing a conductor within a certain longitudinal region of the intermediate portion of the insulation-coated wire in a longitudinal direction in advance, and thus a low-cost water blocking structure for an insulation-coated wire that can ensure high water blocking ability and favorable workability is obtained.

In the water blocking structure for an insulation-coated wire according to the present invention, it is preferable that a coating stripping member having opposing blade portions that are capable of cutting open the coating of the insulation-coated wire on the opposite sides of the intermediate portion with respect to the radial direction is contained inside the tubular member.

With this configuration, before heat shrinkage of the tubular member, when cutting by the opposing blade portions is performed in a state in which a certain amount of stress acts on the coating in the vicinity of the bent region, the coating is reliably cut open at predetermined positions due to a combined effect of the cutting and the stress, and the opposing blade portions prevent the coating in the cut-open state from being closed. As a result, the heat-shrinkable tubular member is thermally shrunken in a state in which the water blocking agent has reliably penetrated the inside of the coating and even, for example, gaps among elemental wires of the conductor from the slit portions of the insulation-coated wire, and thus a water blocking structure for an insulation-coated wire that can ensure high water blocking ability and favorable workability can be realized.

In the water blocking structure for an insulation-coated wire according to the present invention, it is also possible that the coating stripping member has a recessed, wire holding portion further inward than the opposing blade portions, the wire holding portion containing a conductor of the insulation-coated wire while holding slits that are formed by the opposing blade portions in a cut-open state.

With this configuration, the slits in the coating that are formed by the opposing blade portions are reliably held in the cut-open state by the wire holding portion, and the penetrability of the water blocking agent to the inside of the coating of the insulation-coated wire from the slit portions is increased.

In the water blocking structure for an insulation-coated wire according to the present invention, it is preferable that the opposing blade portions have a greater thermal conductivity than both the water blocking agent and the coating, and the water blocking agent is formed of a cured layer of a two-component thermosetting epoxy resin.

With this configuration, during the application of heat for thermally shrinking the tubular member, the blade portions can cut into the coating with an increased efficiency. Also, a low-viscosity, two-component thermosetting epoxy resin that exhibits a high degree of adhesion to the conductor and also easily penetrates gaps among the conductor elemental wires within the coating can be used.

Accordingly, a stable cured layer of a water blocking agent resin in which the resin is cured after reliably penetrating the gaps among the elemental wires and the like of the conductor while being in close contact with the circumference of the conductor within the coating and that has high water blocking ability and high resistance to heat can be formed.

A wire harness according to the present invention includes the water blocking structure for an insulation-coated wire that is configured as described above. With this configuration a low-cost wire harness having high water blocking ability and favorable workability is obtained.

According to the present invention, it is possible to provide a low-cost water blocking structure for an insulation-coated wire that can ensure high water blocking ability and favorable workability at an intermediate portion and also provide a low-cost wire harness having high water blocking ability and favorable workability.

BRIEF DESCRIPTION OF THE DRAWINGS

FIGS. 2A to 2C show a coating stripping member of the water blocking structure for an insulation-coated wire according to the embodiment of the present invention.

EMBODIMENTS OF THE INVENTION

Hereinafter, embodiments for carrying out the present invention will be described.

Embodiment

FIGS. 1 to 6 show an embodiment of a wire harness including a water blocking structure for an insulation-coated wire according to the present invention. In the present embodiment, the present invention is applied to a wire harness for a vehicle, the wire harness having a water blocking structure at an intermediate portion of a single insulation-coated wire. Naturally, the present invention is also applicable to a case where a water blocking structure is provided at an intermediate portion of a plurality of insulation-coated wires.

The configuration of the present embodiment will be described first.

Figure 1:
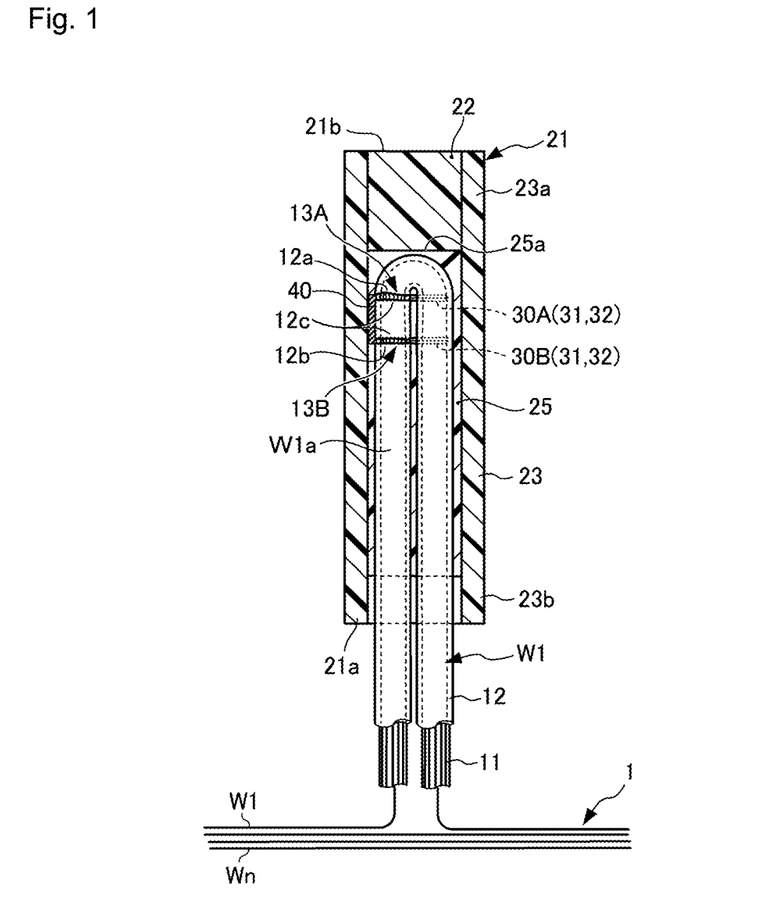
FIG. 1 is a cross-sectional view of a relevant portion of a wire harness including a water blocking structure for an insulation-coated wire according to an embodiment of the present invention.

As shown in FIG. 1, the water blocking structure for an insulation-coated wire according to the present embodiment is provided on an insulation-coated wire W1 of a wire harness 1 having a plurality of insulation-coated wires W1 to Wn (n is a natural number of 2 or more) serving as a group of wires in a bundle.

Figure 6:
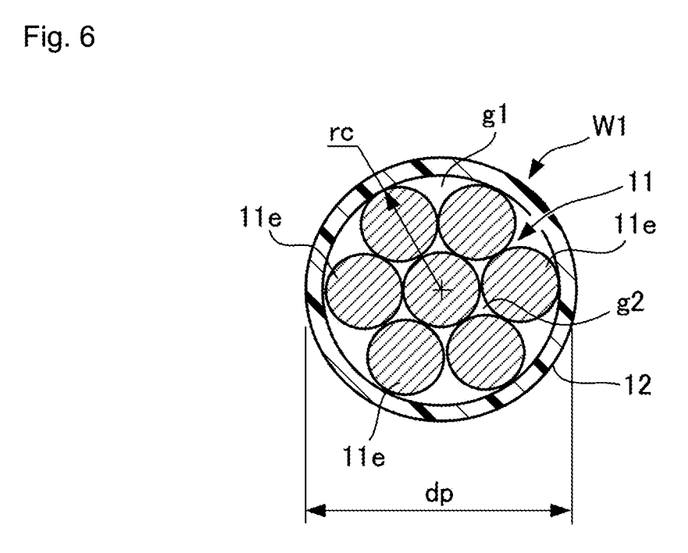
FIG. 6 is a horizontal cross-sectional view of the insulation-coated wire of a portion of the wire harness including the water blocking structure for an insulation-coated wire according to the embodiment of the present invention.

As shown in FIGS. 1 and 6, for example, the insulation-coated wire W1 is constituted by a conductor 11 consisting of a plurality of elemental wires 11e that are bundled together and a coating 12 that concentrically surrounds the conductor 11.

The conductor 11 is configured by, for example, a circular stranded wire obtained by twisting together the plurality of elemental wires 11e, which are soft conducting wires, but is not necessarily required to be a stranded wire. The coating 12 is configured by, for example, a tube of an insulating material having a circular cross section, the tube being made of resin containing vinyl chloride resin as a main component.

An intermediate portion W1a (portion away from both end portions) of the insulation-coated wire W1 in a longitudinal direction is bent in a folded-backward direction as shown in FIG. 1 and thus has a substantially U shape. Moreover, a plurality of linear slit portions 13A and 13B are formed by cutting instruments in the coating 12 within and near a region where this intermediate portion W1a is bent or within a predetermined axial distance from the bent region of the intermediate portion W1a, the slit portions extending in a direction that crosses the axis of the insulation-coated wire W1. These slit portions 13A and 13B are formed by linearly cutting open an intermediate portion of the coating 12 at predetermined positions with the cutting instruments and each allow a portion of the conductor 11 to be exposed to the outside of the coating 12.

As shown in FIG. 1, for example, one of the slit portions 13A is formed within or near the bent region of the intermediate portion W1a of the insulation-coated wire W1 so as to be located on opposite sides of the conductor 11 with respect to the direction (a particular radial direction perpendicular to the paper plane in FIG. 1) of the central axis of the bend of the intermediate portion W1a, and extends in the outer circumferential direction in a horizontal cross section of the coating 12 on the opposite sides with respect to that radial direction. This slit portion 13A may be constituted by a pair of openings each having a shape that opens wide in a central portion with respect to the extending direction or a single opening having a shape that opens wide on the outside of the bend of the intermediate portion W1a.

The other slit portion 13B is formed within a predetermined axial range that is further away from the bent region of the intermediate portion W1a of the insulation-coated wire W1 than the slit portion 13A is so as to be located on opposite sides of the conductor 11 with respect to the radial direction of the intermediate portion W1a. On each side, the slit portion 13B extends in the outer circumferential direction in a horizontal cross section of the coating 12 and, substantially similarly to the slit portion 13A, has an opening shape that opens widest in a central portion with respect to the extending direction or on the outside of the bend.

The cutting directions of these slit portions 13A and 13B may be slanted with respect to the direction shown in the drawing that is perpendicular to the axis of the insulation-coated wire W1 and the central axis of the bend. That is to say, any number of slit portions may be disposed in any position and orientation.

In the intermediate portion W1a of the insulation-coated wire W1, for example, the plurality of elemental wires 11e of the conductor 11 are individually bent in the folded-backward direction and form a substantially U shape. Moreover, the intermediate portion W1a of this insulation-coated wire W1 is accommodated within a heat-shrinkable protective member 21 (tubular member) that has a substantially bottomed cylindrical shape and is closed at one end. The protective member 21 is used to provide insulation, heat resistance, and mechanical protection.

A resin material 25 functioning as a water blocking agent is provided inside the protective member 21, and the resin material 25 is cured in a substantially bottomed cylindrical shape in a state in which the slit portions 13A and 13B and intermediate end portions 12a, 12b, and 12c of the coating 12 that are adjacent to both the slit portions 13A and 13B are coated with the resin material 25.

This resin material 25 penetrates the inside of the coating 12 of the intermediate portion W1a via the slit portions 13A and 13B while being accommodated inside the protective member 21 so as to surround the intermediate portion W1a of the insulation-coated wire W1. Moreover, the resin material 25 has an outer diameter that is larger than the sum of the diameters of a pair of parallel portions of the coating 12 that are continuous with the folded-back intermediate portion W1a of the insulation-coated wire W1, and also has an axial length that is larger than the formation range of the slit portions 13A and 13B in the axial direction of the protective member 21.

Both of the outer diameter and the axial length of the protective member 21 are larger than those of the resin material 25. This protective member 21 has a stopper 22 (closing member) that closes one end of the protective member 21 while being spaced apart from the slit portions 13A and 13B by a predetermined separation distance in the axial direction, and a heat-shrinkable tube 23 that is shrunken to a predetermined shrunken diameter and whose inner circumference on the side of one end portion 23a is in close contact with the stopper 22.

The stopper 22 has a circular horizontal cross section, for example; however, stoppers having an elliptical or other non-circular horizontal cross sections may also be used. Moreover, an annular rib, a flange, an annular groove, or the like may be formed at an outer circumferential portion of the stopper 22, and the stopper 22 may have a truncated cone-shaped vertical cross section.

The heat-shrinkable tube 23 surrounds intermediate end portions 12a, 12b, and 12c of the coating 12 that are in close proximity to the slit portions 13A and 13B on both sides thereof as well as the slit portions 13A and 13B. The heat-shrinkable tube 23 is made of a tube that can shrink in a radial direction when heated, and is obtained by cutting out a tube from a longer tube and shrinking the tube to a predetermined shrunken diameter. This heat-shrinkable tube 23 is a known tube whose shrunken inner diameter after heat shrinkage is generally about ½ of the inner diameter before heat shrinkage.

The stopper 22 has an outer diameter that is larger than a shrunken diameter of the heat-shrinkable tube 23 at the limit of shrinkage and is in close contact with the inner circumference of the end portion 23a of the heat-shrinkable tube 23 in a pressure contact state. It should be noted that the shrunken diameter of the heat-shrinkable tube 23 as used herein refers to a dimension of an inner circumferential surface of the end portion 23a of the heat-shrinkable tube 23 that is geometrically similar to an outer circumferential surface of the stopper 22, with respect to a corresponding radial direction.

The stopper 22 is composed of, for example, a hard resin or a lightweight metal. In the case where the stopper 22 is formed of a resin, a polyolefin resin such as, for example, polypropylene (PP) or polyethylene (PE) can be used. Moreover, forming the heat-shrinkable tube 23 of a polyolefin resin, such as, for example, polypropylene (PP) or polyethylene (PE), can cause the heat-shrinkable tube 23 to develop a heat sealing property on the outer circumferential surface of the stopper 22 when shrinking and coming into close contact with the outer circumference of the stopper 22 in a liquid-tight manner.

The resin material 25 is formed of a thermosetting resin that is cured while being brought into close contact with the protective member 21 and the insulation-coated wire W1, for example, a cured layer obtained by thermally curing a two-component thermosetting epoxy resin having low viscosity. The low viscosity means such a degree of viscosity that the two-component thermosetting epoxy resin having fluidity before thermal curing exhibits a high degree of adhesion to the circumference of the conductor 11 exposed in the slit portions 13A and 13B and also easily penetrates gaps g1 and g2 (see FIG. 6) among the elemental wires 11e in the vicinity of the slit portions 13A and 13B.

Thus, the resin material 25 is cured while forming one end surface 25a that is in close contact with the stopper 22 between the protective member 21 and the insulation-coated wire W1 and penetrating the inside of the coating 12 from the slit portions 13A and 13B and also the gap g2 that is formed among the elemental wires 11e on the inside of the slit portions 13A and 13B.

On the other hand, within the protective member 21, the coating stripping member 40 having a plurality of cutting blade portions 30A and 30B (opposing blade portions) individually constituted by sharp opposing blades 31 and 32 that are capable of cutting open the coating 12 as well as a joint portion 33 that integrally joins the cutting blade portions 30A and 30B to each other is contained.

The coating stripping member 40 is adapted to form the slit portions 13A and 13B in the coating 12 of the insulation-coated wire W1 with the cutting blade portions 30A and 30B and thus be able to provide the function of exposing a portion of the conductor 11 in the coating 12 to the outside of the coating 12 without stripping the coating 12 from the conductor 11, that is to say, the function equivalent to stripping the coating.

Figure 2A:
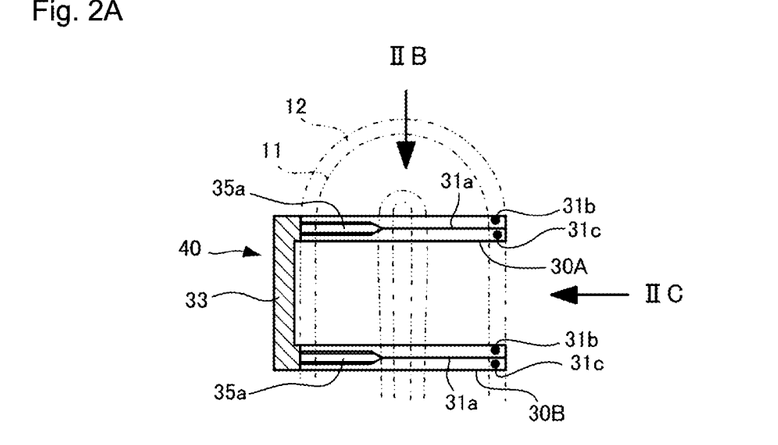
FIG. 2A is a cross-sectional view.

A keyhole-shaped recess 34 is formed in each of the cutting blade portions 30A and 30B. The opposing blades 31 and 32 are arranged in a substantially V shape on the entrance side of the recess 34, and a recessed, wire holding portion 35 that has a predetermined radius and in which the cutting edge is flattened is disposed on the inner side of the recess 34.

The wire holding portions 35 are located further inward of the respective recesses 34 than the opposing blades 31 and 32 of the cutting blade portions 30A and 30B, and hold the conductor 11 of the insulation-coated wire W1 in a state in which the wire holding portions 35 are inserted into the slit portions 13A and 13B of the coating 12.

Figure 2B:
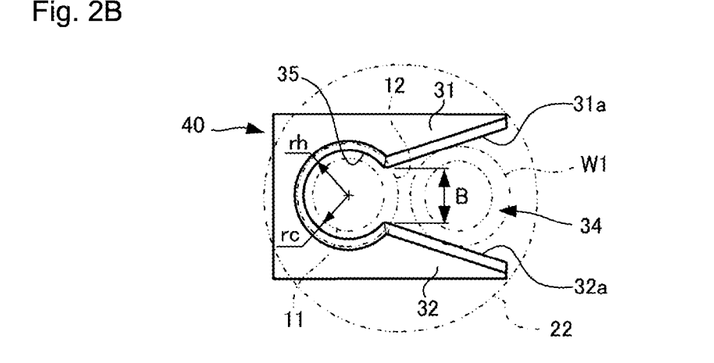
FIG. 2B is a view in the direction of arrow IIB in FIG. 2A.
Figure 2C:
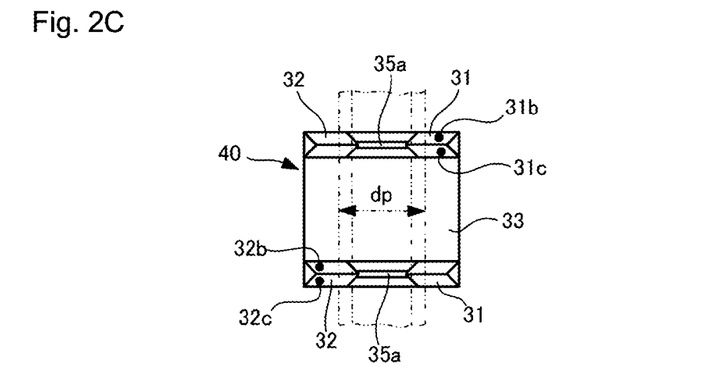
FIG. 2C is a view in the direction of arrow IIC in FIG. 2A.

Specifically, as shown in FIGS. 2A to 2C, each wire holding portion 35 has a horseshoe-shaped inner circumferential wall surface 35a that extends halfway or more around the conductor 11 of the insulation-coated wire W1, and the radius rh of this inner circumferential wall surface 35a is set to be smaller than the radius (dp/2) of the coating 12 of the insulation-coated wire W1 and larger than or equal to the radius rc of the conductor 11 (rc≤rh<dp/2).

It is also possible that the radius of the wire holding portions 35 is reduced on the central side of the respective slit portions 13A and 13B and increased on the corner side of the respective slit portions 13A and 13B. Moreover, it is also possible that the wire holding portions 35 have a substantially U-shaped recessed shape. The width of each inner circumferential wall surface 35a is substantially fixed and may be, for example, 1 mm or less.

Moreover, as shown in FIG. 2A, the inner circumferential wall surface 35a of each wire holding portion 35 is adjacent to the cutting edge line 31a and the two blade surfaces 31b and 31c of the opposing blade portion 31 on one end side, and is similarly adjacent to the cutting edge line 32a and the two blade surfaces 32b and 32c of the opposing blade portion 32 on the other end side.

Furthermore, a minimum cutting edge distance B with which the cutting edge lines 31a and 32a of the respective opposing blades 31 and 32 are the closest to each other is substantially equal to the entrance width, which is the distance between the two ends of the inner circumferential wall surface 35a of the wire holding portion 35 that are respectively connected to the cutting edge lines 31a and 32a.

This minimum cutting edge distance B is set at a value that is slightly smaller than the diameter (2rc) of the conductor 11 of the insulation-coated wire W1, for example, 80% to 90% of the diameter of the conductor 11 so that when the insulation-coated wire W1 passes through the portion of the minimum cutting edge distance B between the opposing blades 31 and 32, the coating 12 can be reliably cut open by the opposing blades 31 and 32.

The two end portions of the inner circumferential wall surface 35a that are continuous with the respective inner end portions of the opposing blades 31 and 32 at the minimum cutting edge distance B from each other may each be an obtuse cutting edge surface or may be the same curved surface as that of the central portion.

Figure 3A:
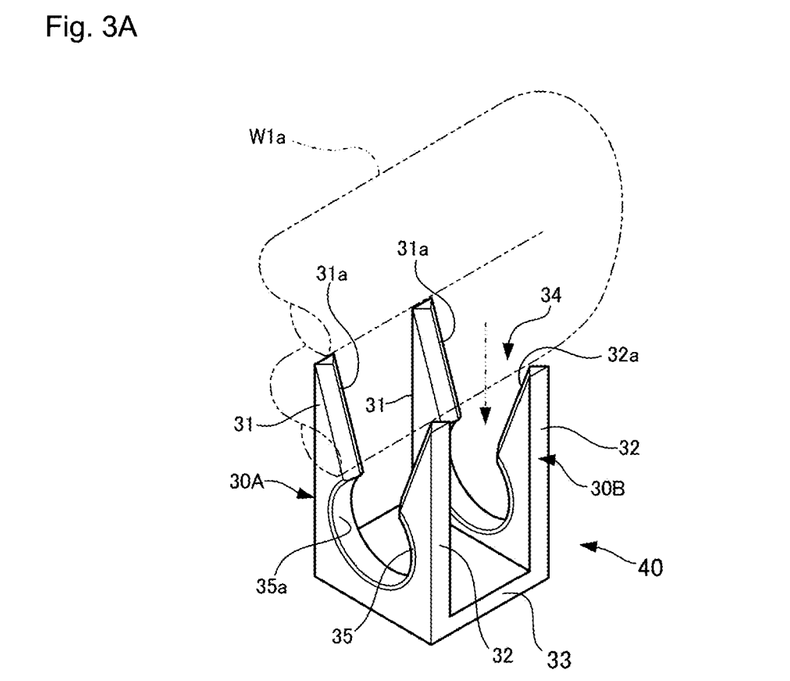
FIG. 3A is a perspective view showing a direction in which the coating stripping member of the water blocking structure for an insulation-coated wire according to the embodiment of the present invention cuts into the insulation-coated wire.
Figure 3B:
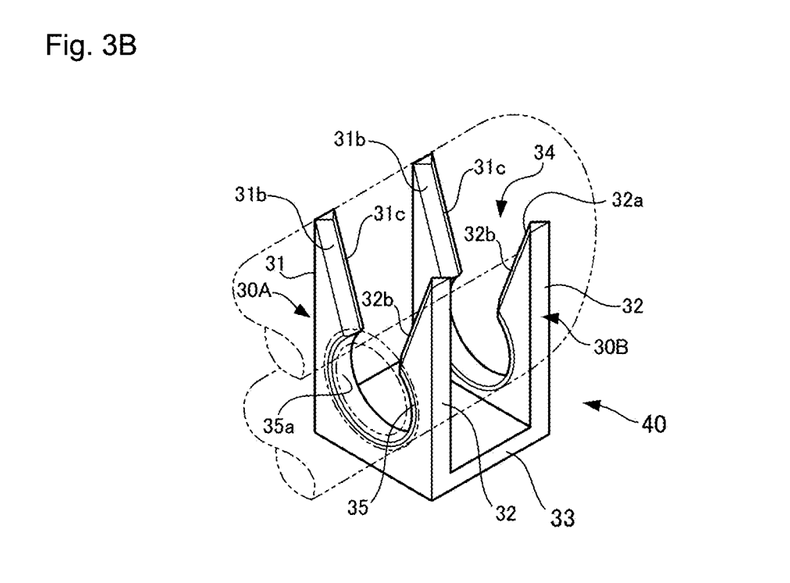
FIG. 3B is a perspective view showing an installation position of the coating stripping member in a state in which the coating stripping member cuts into the insulation-coated wire.

With the coating stripping member 40 as described above, it is possible that when a portion of the insulation-coated wire W1 is pushed into the recesses 34 as shown in FIG. 3A, the opposing blades 31 and 32 are caused to cut into the coating 12, and when the portion of the insulation-coated wire W1 is pushed to the inner side of the recesses 34 as shown in FIG. 3B, the conductor 11 exposed in the slit portions 13A and 13B is contained in the wire holding portions 35 while the slit portions 13A and 13B of the coating 12 that are made by the opposing blades 31 and 32 are held in the cut-open state by the wire holding portions 35.

Figure 4A:
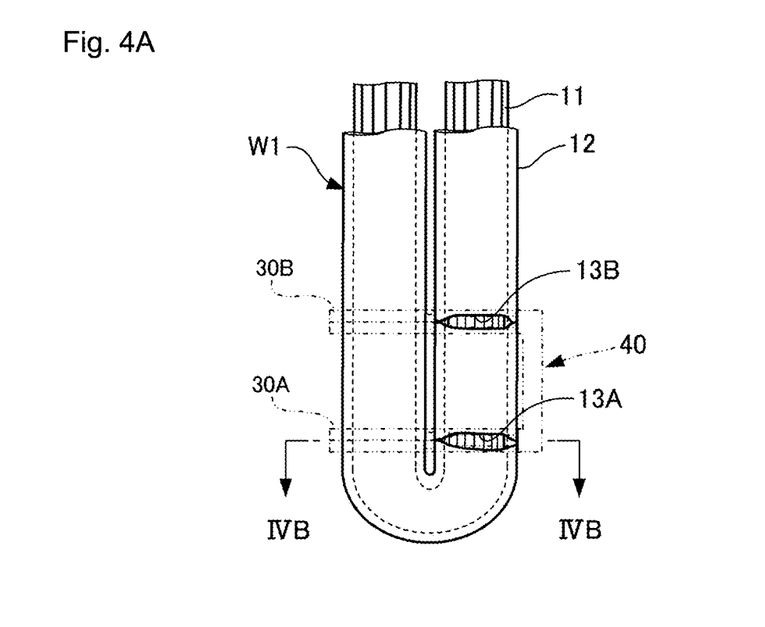
FIG. 4A is an explanatory diagram of slit portions in the insulation-coated wire of the water blocking structure for an insulation-coated wire according to the embodiment of the present invention.
Figure 4B:
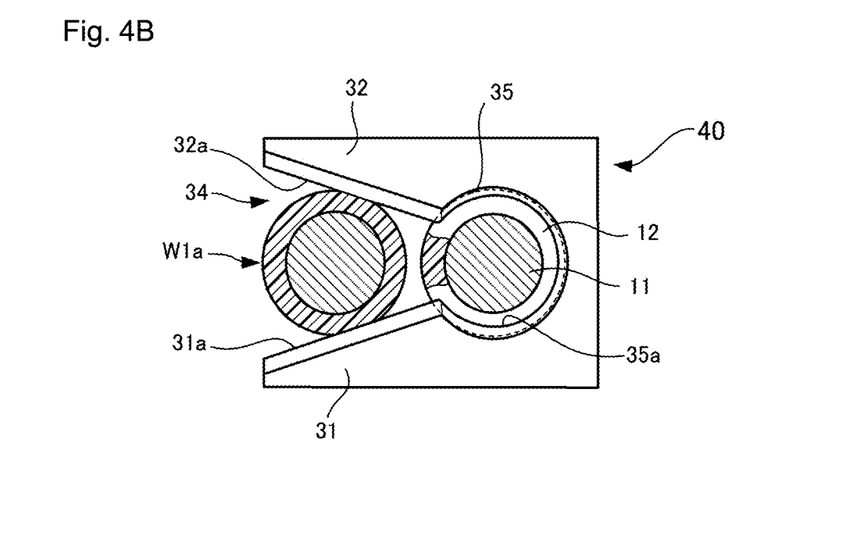
FIG. 4B is a cross-sectional view in the direction of arrows IVB-IVB in FIG. 4A.

FIG. 4A illustrates exemplary opening shapes of the slit portions 13A and 13B in the coating 12 when held in the cut-open state by the wire holding portions 35 in the above-described manner, and FIG. 4B illustrates a horizontal cross section of the intermediate portion W1a of the insulation-coated wire W1 at the center of the slit portion 13A in conjunction with the cutting blade portion 30A.

At least the opposing blades 31 and 32 of the coating stripping member 40 are each made of a material having a sufficiently greater thermal conductivity than both the resin material 25 and the coating 12, for example, a metal whose thermal conductivity is ten or more times greater than those of both the resin material 25 and the coating 12. Naturally, the entire coating stripping member 40 may also be formed of such a material having a high thermal conductivity.

Next, an example of a method for manufacturing the wire harness 1 of the present embodiment will be described.

Figure 5:
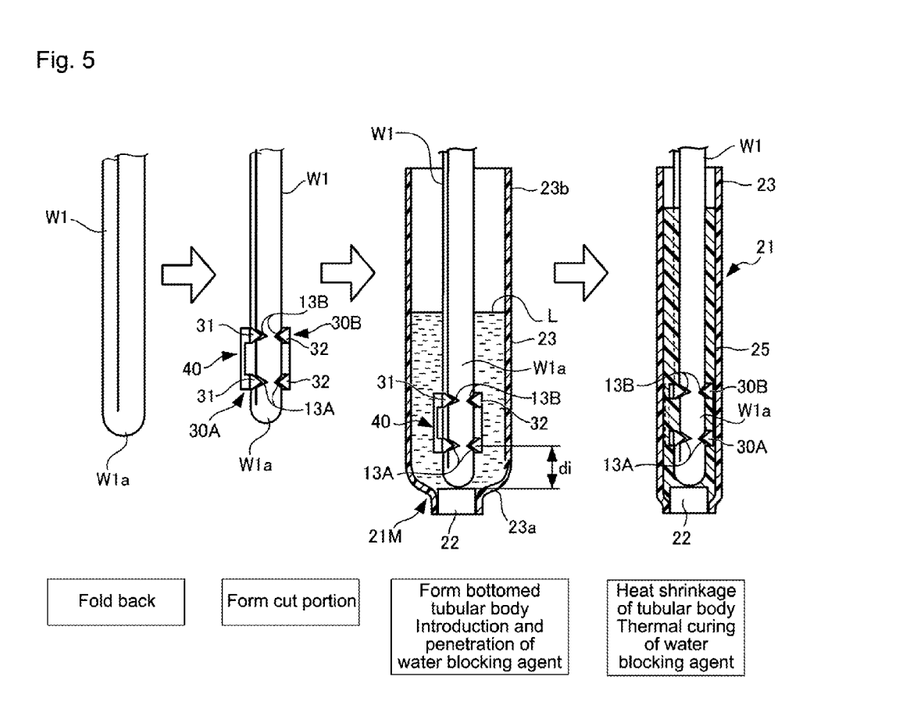
FIG. 5 is an explanatory diagram of a manufacturing process of the wire harness including the water blocking structure for an insulation-coated wire according to the embodiment of the present invention.

First, as shown in a folding back step in FIG. 5, the intermediate portion W1a of the insulation-coated wire W1 is bent in a folded-backward direction in a substantially U shape.

Then, as shown in FIG. 3 and a cut portion forming step in FIG. 5, the coating stripping member 40 is engaged with the substantially U-shaped intermediate portion W1a of the insulation-coated wire W1 from one side, and thus the coating stripping member 40 is caused to function.

That is to say, the coating stripping member 40 cuts open the coating 12 in the bent region of the insulation-coated wire W1 with the opposing blades 31 and 32, without stripping the coating 12 from the conductor 11, and thus the slit portions 13A and 13B that expose a portion of the conductor 11 inside the coating 12 to the outside of the coating 12 are formed on opposite sides with respect to the radial direction, which is the direction of the central axis of the bend of the intermediate portion W1a.

During formation of this slit portions 13A and 13B, in a state in which a tensile stress is produced in the coating 12 in the bent region of the bent insulation-coated wire W1 such that the tensile stress increases toward the outside of the bend, the opposing blades 31 and 32 cut into the coating 12 in the vicinity of and within a predetermined distance range from that region. Thus, the slit portions 13A and 13B that open wide at their central portions with respect to the slit's longitudinal direction are formed in the intermediate portion W1a of the insulation-coated wire W1 (see FIG. 4A).

Moreover, the opposing blades 31 and 32 are located at a depth position where the opposing blades 31 and 32 are cutting into the coating 12, and also a portion of the conductor 11 is exposed to the outside of the coating 12.

Then, as shown in a bottomed tubular body forming step in FIG. 5, the end portion 23*a* of the heat-shrinkable tube 23 is heated by hot air or the like to form a bottomed tubular body 21M for the protective member 21 in which the end portion 23*a* of the heat-shrinkable tube 23 is brought into close contact with the outer circumference of the stopper 22. At this time, the height of the cylindrical surface where the end portion 23*a* of the heat-shrinkable tube 23 and the stopper 22 are in close contact with each other is regulated such that a bottom surface (inner bottom surface) of the bottomed tubular body 21M on the inner side is separated from the position at which the slit portion 13A is formed by a predetermined separation distance di in the axial direction.

Then, the intermediate portion W1*a* of the insulation-coated wire W1 that is bent in the substantially U shape and the coating stripping member 40 are inserted into the bottomed tubular body 21M from the side of a larger-diameter end potion 23*b* of the heat-shrinkable tube 23 before heat shrinkage so that the circumference of the stopper 22 that is integral with the coating stripping member 40 is surrounded by the end portion 23*a* of the heat-shrinkable tube 23.

Then, as shown in a water blocking agent introduction and penetration step in FIG. 5, the heat-shrinkable tube 23 whose end portion 23*a* is closed by the stopper 22 is oriented in the vertical direction with the closed end being located on the lower side, and a predetermined amount of two-component thermosetting epoxy resin solution L (water blocking agent), which is the material for the resin material 25, is introduced into the bottomed tubular body 21M from the vertically upper side of the heat-shrinkable tube 23 where the other end portion 23*b* is open. The amount of the solution to be introduced is set such that the intermediate portion W1*a* of the insulation-coated wire W1, especially within a certain distance from the slit portions 13A and 13B, is immersed in the thermosetting epoxy resin solution L.

At this time, since the slit portions 13A and 13B are formed in the intermediate portion W1*a* of the insulation-coated wire W1, and a portion of the conductor 11 is exposed in the slit portions 13A and 13B, the thermosetting epoxy resin solution L having low viscosity and high penetrability enters the inside of the coating 12 from the slit portions 13A and 13B of the insulation-coated wire W1 and even, for example, gaps among the plurality of elemental wires 11*e* of the conductor 11, and due to a combined effect of capillary phenomenon, negative pressure produced within the coating 12, and the like, a state in which the thermosetting epoxy resin solution L reliably penetrates through a water blocking region within a predetermined distance from the slit portions 13A and 13B is achieved.

Then, as shown in a tubular body heat shrinkage and water blocking agent thermal curing step in FIG. 5, the bottomed tubular body 21M in a state in which the insulation-coated wire W1 is inserted to a predetermined insertion depth position and the slit portions 13A and 13B are immersed in the water blocking agent is entirely heated from the outside to shrink the heat-shrinkable tube 23 of the bottomed tubular body 21M and thermally cure the thermosetting epoxy resin solution L in that heat-shrinkable tube 23.

At this time, first, the heat-shrinkable tube 23 of the bottomed tubular body 21M undergoes heat shrinkage so that the diameter thereof is significantly reduced overall, and thus the heat-shrinkable tube 23 is formed, and the surface level of the thermosetting epoxy resin solution L increases. Then, when the heat-shrinkable tube 23 entirely shrinks to such an extent that the diameter thereof approaches a predetermined shrunken diameter, the thermosetting epoxy resin solution L has started to thermally cure, and finally, when the heat-shrinkable tube 23 entirely shrinks to almost the predetermined shrunken diameter that is close to the limit of shrinkage, the resin material 25 composed of a cured layer of the thermosetting epoxy resin is formed.

Next, the effects of the present embodiment will be described.

In the present embodiment that is configured as described above, the slit portions 13A and 13B from which the water blocking agent is allowed to penetrate to the inside of the coating 12 is formed in the vicinity of or within a certain distance range from the bent region where the intermediate portion W1*a* of the insulation-coated wire W1 is bent in the folded-backward direction. Accordingly, the necessity to perform the coating stripping operation (intermediate sheath stripping operation) for exposing the conductor within a specific longitudinal region of the intermediate portion W1*a* of the insulation-coated wire W1 in the longitudinal direction in advance is eliminated.

Specifically, in a state in which a stress due to bending is produced in the intermediate portion W1*a* of the insulation-coated wire W1 in the vicinity of the bent region, when slits having a predetermined depth are made in the coating 12 by the opposing blades 31 and 32, which are cutting instruments, the openings of the slits are widened due to the effect of the stress, and thus the slit portions 13A and 13B that expose a portion of the conductor 11 to the outside of the coating 12 are formed.

Accordingly, before heat shrinkage of the heat-shrinkable tube 23 of the protective member 21, the two-component thermosetting epoxy resin solution L, which is the water blocking agent, penetrates the inside of the coating 12 of insulation-coated wire W1 and even, for example, gaps among the elemental wires of the conductor 11 via the slit portions 13A and 13B. Moreover, when the heat shrinkage of the heat-shrinkable tube 23 of the protective member 21 and the thermal curing of the two-component thermosetting epoxy resin solution L start from the outer side, the inner pressure of the thermosetting epoxy resin solution L inside the bottomed tubular body 21M tends to increase. Accordingly, the two-component thermosetting epoxy resin solution L, which is the water blocking agent, reliably penetrates the inside of the coating 12 of the insulation-coated wire W1 and even, for example, gaps among the elemental wires of the conductor 11 via the slit portions 13A and 13B. Then, when the heat-shrinkable tube 23 has been thermally shrunken to the predetermined shrunken diameter, and also the thermal curing of the thermosetting epoxy resin solution L has been finished, the water blocking structure for the insulation-coated wire is completed.

As a result, according to the present embodiment, the wire harness 1 having a low-cost water blocking structure for an insulation-coated wire that can ensure high water blocking ability and favorable workability can be provided without the intermediate sheath stripping operation.

Moreover, according to the present embodiment, since the slit portions 13A and 13B are reliably held in the cut-open state by the wire holding portions 35, the penetrability of the water blocking agent to the inside of the coating increases.

In addition, since the opposing blades 31 and 32 according to the present embodiment have a sufficiently greater thermal conductivity than both the water blocking agent and the coating 12, during the application of heat for thermally shrinking the heat-shrinkable tube 23, the opposing blades 31 and 32 can cut into and open the coating 12 with a sufficiently increased efficiently.

Moreover, according to the present embodiment, an inner diameter of the heat-shrinkable tube 23 that is suitable for the operation of inserting the wire into the heat-shrinkable tube 23 of the protective member 21 can be set easily, and before thermal curing of the thermosetting epoxy resin solution L, which is the water blocking agent, the water blocking agent can be easily introduced into the heat-shrinkable tube 23 of the protective member 21 together with a portion of the insulation-coated wire W1. Moreover, the low-viscosity, two-component thermosetting epoxy resin solution L that exhibits a high degree of adhesion to the conductor 11 and also easily penetrates the gaps g1 and g2 and the like in the coating 12 can be used. Accordingly, a stable cured layer that has high water blocking ability and high resistance to heat and that has reliably penetrated the circumference of the conductor 11, the gaps among the elemental wires, and the like within the coating 12 can be formed as the resin material 25.

As described above, according to the present embodiment, it is possible to provide a low-cost water blocking structure for an insulation-coated wire that can ensure high water blocking ability and favorable workability at the intermediate portion W1a of the insulation-coated wire W1, and it is possible to provide the low-cost wire harness 1 that employs this water blocking structure and thus has high water blocking ability and favorable workability.

Other Embodiments

Figure 7:
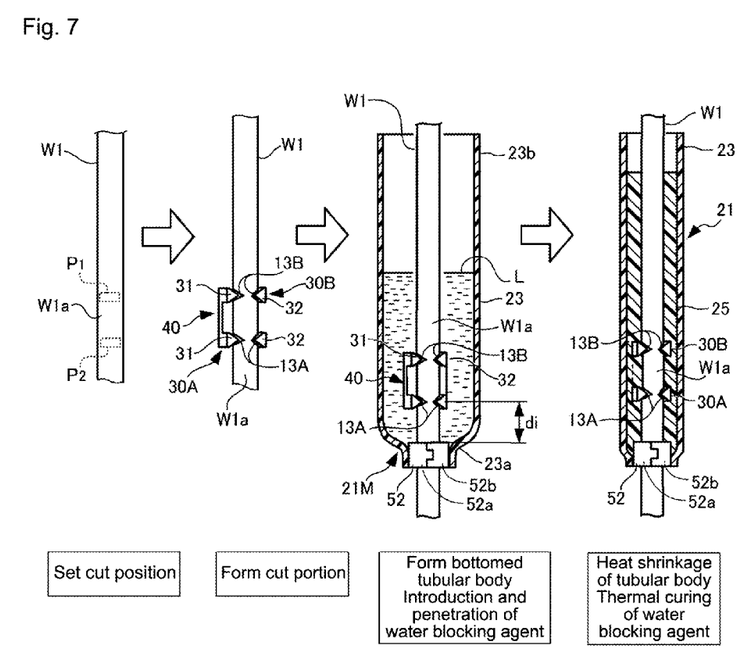
FIG. 7 is an explanatory diagram of a manufacturing process of a wire harness including a water blocking structure for an insulation-coated wire according to another embodiment of the present invention.

FIG. 7 shows a schematic manufacturing process of a wire harness including a water blocking structure for an insulation-coated wire according to another embodiment of the present invention.

Although the intermediate portion W1a of the insulation-coated wire W1 is folded back in a substantially U shape in the above-described embodiment, the present invention is also applicable to a case where water blocking is performed at the intermediate portion W1a of the insulation-coated wire W1 that is not folded back and has a substantially straight shape.

The water blocking structure for an insulation-coated wire according to the other embodiment performs water blocking of the intermediate portion W1a of the insulation-coated wire W1 that has such a substantially straight shape, and the protective member 21 has an annular stopper 52 (closing member) that is substituted for the stopper 22 for completely closing the protective member 21. This stopper 52 is composed of two parts that engage with each other by protrusion-recess engagement. Since the other configurations are the same as those of the above-described embodiment, the same or similar constituent portions are denoted by the use of the reference numerals of the corresponding components shown in FIGS. 1 to 6, and the differences will be described below.

Specifically, as shown in a bottomed tubular body forming step in FIG. 7, the stopper 52 is composed of an annular body into which a pair of substantially semi-cylindrical stopper members 52a and 52b are integrated by protrusion-recess engagement. Moreover, a plurality of annular ribs, which are not shown, are provided on the inner circumferential surface side of this stopper 52, the annular ribs being spaced apart from one another in the axial direction, and the inner diameter of the stopper 52 is slightly smaller than the outer diameter of the coating 12. That is to say, the stopper 52 is in close contact with the outer circumference of the coating 12 with a predetermined interference.

In the present embodiment, as shown in a cut position setting step in FIG. 7, first, a plurality of cut positions P1 and P2 are set in the substantially straight-shaped intermediate portion W1a of the insulation-coated wire W1, and then, as shown in a cut portion forming step in FIG. 7, the coating stripping member 40 is engaged with the intermediate portion W1a of the insulation-coated wire W1 from one side, and the coating stripping member 40 is caused to function. It should be noted that the coating stripping member 40 may be reduced to a recess depth that is approximately equal to the diameter of a single insulation-coated wire W1, or a guide or a restricting portion that bends the coating 12 of the insulation-coated wire W1 in a meandering manner may be provided in the coating stripping member 40.

Also in the present embodiment, the slit portions 13A and 13B that expose a portion of the conductor 11 inside the coating 12 to the outside of the coating 12 can be formed on opposite sides of the intermediate portion W1a with respect to the radial direction without stripping the coating 12 from the conductor 11, by the coating stripping member 40 cutting open the coating 12 of the insulation-coated wire W1 with the opposing blades 31 and 32.

Then, as shown in a bottomed tubular body forming step in FIG. 7, the intermediate portion W1a of the insulation-coated wire W1 in which the slit portions 13A and 13B are formed is surrounded by the pair of substantially semi-cylindrical stopper members 52a and 52b, and the two stopper members 52a and 52b are integrated into the annular stopper 52 by protrusion-recess engagement. It should be noted that it is also possible to attach this annular stopper 52 to the intermediate portion W1a of the insulation-coated wire W1 prior to the coating stripping member 40 and perform positioning of the coating stripping member 40 in the axial direction with reference to the stopper 52 during attachment of the coating stripping member 40.

Then, the bottomed tubular body 21M for the protective member 21 is produced by heating the end portion 23a of the heat-shrinkable tube 23 with hot air or the like and thereby bringing the end portion 23a into close contact with the outer circumference of the stopper 52. Also, the intermediate portion W1a of the insulation-coated wire W1 and the coating stripping member 40 are inserted into the bottomed tubular body 21M from the side of the larger-diameter end portion 23b of the heat-shrinkable tube 23 before heat shrinkage so that the end portion 23a of the heat-shrinkable tube 23 surrounds the circumference of the stopper 52 constituting a portion of the coating stripping member 40. At this time, the end portion 23a of the heat-shrinkable tube 23 is closed by the stopper 52 and the intermediate portion W1a of the insulation-coated wire W1.

Then, as shown in a water blocking agent introduction and penetration step in FIG. 7, the two-component thermosetting epoxy resin solution L is introduced into the bottomed tubular body 21M from the side of the other end portion 23b of the heat-shrinkable tube 23, and the intermediate portion W1a of the insulation-coated wire W1, especially within a certain distance from the slit portions 13A and 13B, is immersed in the thermosetting epoxy resin solution L.

Then, as shown in a tubular body heat shrinkage and water blocking agent thermal curing step in FIG. 7, the bottomed tubular body 21M in a state in which the insulation-coated wire W1 is inserted to a predetermined insertion depth position and the slit portions 13A and 13B are immersed in the water blocking agent is entirely heated from the outside to shrink the heat-shrinkable tube 23 of the bottomed tubular body 21M and thermally cure the thermosetting epoxy resin solution L in that heat-shrinkable tube 23.

In the present embodiment, the same effects as those of the above-described embodiment can be obtained as well.

It should be noted that although a configuration in which the two cutting blade portions 30A and 30B each having the opposing blades 31 and 32 are arranged inside the heat-shrinkable tube 23 of the protective member 21 is adopted in the foregoing embodiments, a single cutting blade portion having the opposing blades 31 and 32 may be provided, or three or more cutting blade portions may be provided. That is to say, although the slit portions 13 are formed at two positions in the intermediate portion W1a of the insulation-coated wire W1 in the axial direction, it is also possible to form a slit portion at one position or slit portions at three or more positions in the axial direction.

Furthermore, although the shape of the cutting blade portions 30A and 30B of the coating stripping member 40 is illustrated as a shape like a rectangle and having angular portions at the four corners in the foregoing embodiments, it goes without saying that the angular portions can be chamfered or formed as curved surfaces.

Moreover, it is sufficient if the opposing blades 31 and 32 can form the slit portions 13A and 13B in the coating 12 of one leg portion of the folded-back substantially U-shaped intermediate portion W1a of the insulation-coated wire W1, and the opposing blades 31 and 32 may be reduced, or the cutting edges of the opposing blades 31 and 32 on the entrance side of the recesses 34 may be flattened. Moreover, although the cutting blade portions 30A and 30B of the coating stripping member 40 are metal blades in the above-described embodiment, the cutting blade portions may be formed of a hard resin instead of being metal blades, and the cutting edges thereof may also be saw-shaped.

As described above, the present invention can provide a low-cost water blocking structure for an insulation-coated wire that can ensure high water blocking ability and favorable workability at an intermediate portion of the insulation-coated wire as well as a wire harness including the water blocking structure, and is useful for a water blocking structure for an insulation-coated wire that is effective when provided at an intermediate portion of the insulation-coated wire as well as wire harnesses in general.

What is claimed is:

1. A water blocking structure for an insulation-coated wire, the water blocking structure comprising:
    a heat-shrinkable tubular member that is closed at one end by a closing member and that accommodates an intermediate portion of an insulation-coated wire, and a water blocking agent that is accommodated in the tubular member and that penetrates the intermediate portion of the insulation-coated wire,
    wherein slit portions are formed in a coating of the insulation-coated wire within the tubular member, the slit portions extending in a direction that crosses an axis of the insulation-coated wire on opposite sides of the intermediate portion with respect to a radial direction, and the water blocking agent penetrates the intermediate portion via the slit portions; and
    a coating stripping member positioned inside of the tubular member and having opposing blade portions that define a lateral insertion opening at an outer periphery of the coating stripping member, thereby allowing the insulation-coated wire to be laterally inserted into the coating stripping member,
    the opposing blades being configured to cut open the coating of the insulation-coated wire on the opposite sides of the intermediate portion with respect to the radial direction, thereby providing the slit portions.

2. The water blocking structure for an insulation-coated wire according to claim 1,
    wherein the coating stripping member has a recessed wire holding portion located further inward than the opposing blade portions, the wire holding portion containing a conductor of the insulation-coated wire while holding the slit portions that are formed by the opposing blade portions in a cut-open condition.

3. The water blocking structure for an insulation-coated wire according to claim 2,
    wherein the opposing blade portions have a greater thermal conductivity than both the water blocking agent and the coating, and the water blocking agent is formed of a cured layer of a two-component thermosetting epoxy resin.

4. A wire harness comprising the water blocking structure for an insulation-coated wire according to claim 3.

5. A wire harness comprising the water blocking structure for an insulation-coated wire according to claim 2.

6. The water blocking structure for an insulation-coated wire according to claim 1,
    wherein the opposing blade portions have a greater thermal conductivity than both the water blocking agent and the coating, and the water blocking agent is formed of a cured layer of a two-component thermosetting epoxy resin.

7. A wire harness comprising the water blocking structure for an insulation-coated wire according to claim 6.

8. A wire harness comprising the water blocking structure for an insulation-coated wire according to claim 1.

9. The water blocking structure for an insulation-coated wire according to claim 1, wherein the opposing blade portions converge towards each other in a direction in which the insulation-coated wire is laterally inserted into the lateral insertion opening.

10. The water blocking structure for an insulation-coated wire according to claim 1, wherein the coating stripping member is embedded within a material of the water blocking agent.

* * * * *